United States Patent [19]

Mandil

[11] 4,206,273
[45] Jun. 3, 1980

[54] PROTECTOR FOR A BATTERY STRAP

[75] Inventor: Jacques Mandil, Boulogne, France

[73] Assignee: Compagnie Europeenne d'Accumulateurs, Paris, France

[21] Appl. No.: 12,087

[22] Filed: Feb. 14, 1979

[30] Foreign Application Priority Data

Feb. 21, 1978 [FR] France ................ 78 04887

[51] Int. Cl.² ............................................. H01M 2/20
[52] U.S. Cl. ........................................ 429/65; 429/121
[58] Field of Search ............................ 429/65, 120, 121

[56] References Cited

U.S. PATENT DOCUMENTS

| | | | |
|---|---|---|---|
| 2,564,810 | 8/1951 | Martin et al. | 429/65 |
| 3,483,043 | 12/1969 | Steffens | 429/120 |
| 3,748,185 | 7/1973 | Cooper et al. | 429/120 |
| 3,884,725 | 5/1975 | Schmidt | 429/65 |
| 3,943,007 | 3/1976 | Lebrun | 429/120 |

*Primary Examiner*—Donald L. Walton
*Attorney, Agent, or Firm*—Sughrue, Rothwell, Mion, Zinn and Macpeak

[57] ABSTRACT

The protector has two ends connected to a central portion, these ends being hollow and each suitable for covering one of the two terminals of two contiguous cells of the battery, the central portion being hollow and being able to cover the connection or strap between said terminals, the upper surfaces of said ends having openings or gaps separated by strips of material, the upper surface as well as the side surfaces of said central portion also having openings or gaps separated by strips of material. The area of said openings or gaps is about twice as great as that of the total area of the strips.

5 Claims, 3 Drawing Figures

PROTECTOR FOR A BATTERY STRAP

FIELD OF THE INVENTION

The present invention relates to a protector for a battery strap, suitable for protecting storage batteries.

BACKGROUND OF THE INVENTION

It is known that storage batteries are installed with lead connections or straps which connect the terminals of the various cells together.

There is therefore a permanent danger of short-circuits during the handling of these batteries and the higher the power, the greater the danger. This is the case in particular with traction batteries.

The present invention proposes to mitigate such a drawback and it relates to a protector for a battery strap, said protector reducing the danger of a short-circuit in a battery while permitting satisfactory cooling thereof during operation.

SUMMARY OF THE INVENTION

The present invention provides a protector for a cell-interconnecting strap of a storage battery, the protector having two ends connected to a central portion. The ends are hollow and each is suitable for covering a cell terminal of the battery. The central portion is hollow and is suitable for covering a strap interconnecting two cell terminals. The upper surfaces of said ends have openings or gaps separated by strips of material, the upper surface as well as the side surfaces of said central portion also have openings or gaps separated by strips of material.

An embodiment of the present invention is described by way of example, with reference to the accompanying drawings.

DESCRIPTION OF THE PREFERRED EMBODIMENTS

Figure 1:
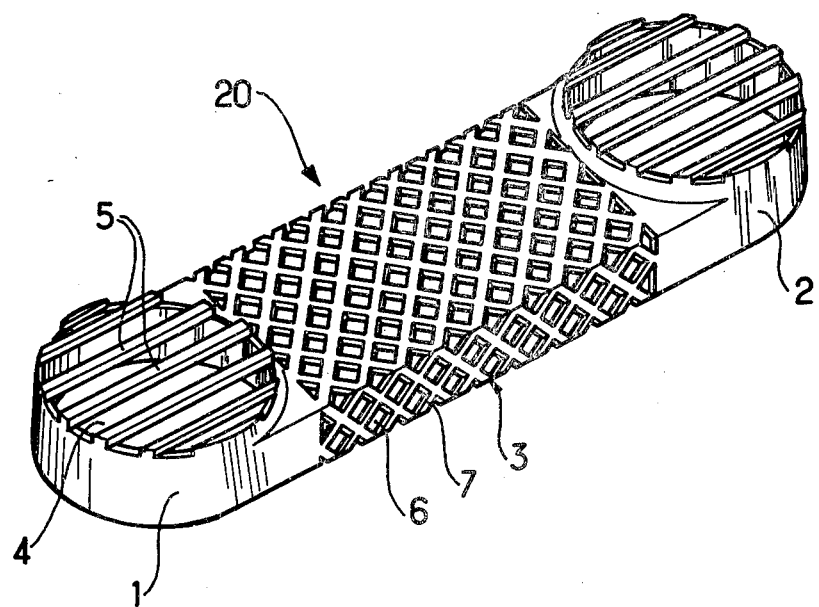
FIG. 1 is an perspective view of an extendable battery strap protector embodying the invention.
Figure 2:
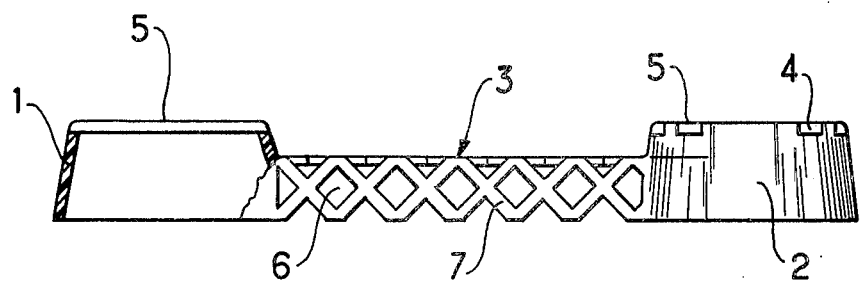
FIG. 2 is an elevation and partial cross-section of said protector embodying the invention.

With reference to FIGS. 1 and 2, a battery strap protector 20 embodying the invention has two substantially cylindrical ends 1 and 2 connected by a central portion 3 which has a partially rectangular transversal cross-section.

As illustrated in the figures, the ends 1 and 2 are hollow and their upper surfaces have an open-work configuration so that they leave gaps 4 separated by strips of material 5.

Similarly, the central portion 3 is hollow and its upper surface as well as both its side surfaces have gaps or openings 6 delimited by strips 7 of material; therefore, by way of a non-limiting example the assembly is in the form of a system of rectangular gaps or openings 6 delimited by strips of material 7 which are substantially perpendicular to one another.

Figure 3:
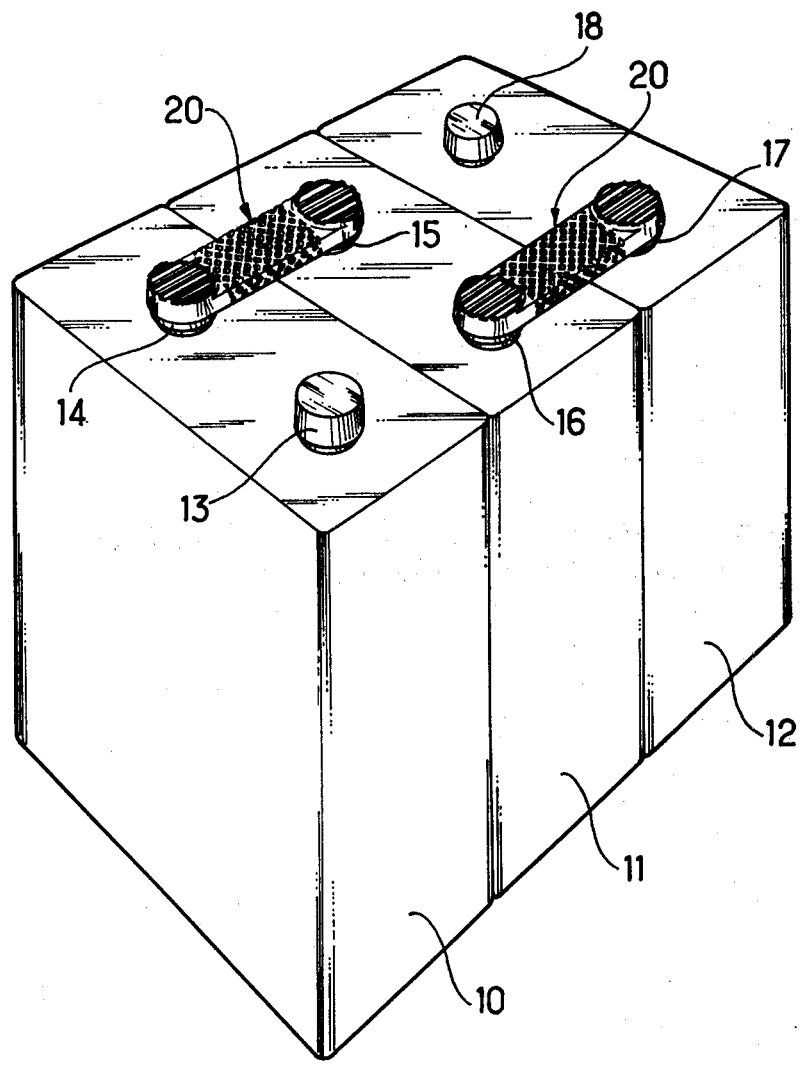
FIG. 3 is a perspective view which illustrates the installation of a strap protector on a storage battery.

Of course, neither the ends 1 and 2 nor the central portion 3 are closed by a lower surface, so that they can be fitted on a battery, as shown with reference to FIG. 3.

Such an assembly is evidently made of an electronically insulating material, in particular rubber or a plastics material.

In accordance with another characteristic of the invention, the gaps and openings 4 and 6 represent about two thirds of the total area; therefore only one third of material covers the lead surface of the battery.

With reference to FIG. 3, there is illustrated a battery formed by three cells 10, 11, 12 whose output terminals are referenced successively from 13 to 18.

Respective lead battery straps (not shown) connect together the terminals 14 and 15, and the terminals 16 and 17.

Respective protectors 20 are disposed on the terminals 14 and 15, and on the terminals 16 and 17, as well as on the straps which connect them together, in such a way that the ends cover said terminals, while the central portions cover the lead straps.

It is therefore seen that this avoids short circuits caused, for example, by a metal tool dropping on the battery.

Further, the battery can lose heat through the open-work configuration of the strap protectors embodying the invention.

It will be observed that the resiliency of the protectors allows them to be installed very easily and rapidly on connections of various sizes.

Further, they can be very easily made by any technology suitable for plastics materials, in particular moulding.

Advantageous applications are therefore found in relatively high-power batteries such as traction batteries.

I claim:

1. A protector for a cell-interconnecting strap of a storage battery having spaced cell terminals joined by said strap, said protector having an upper wall, opposed side walls and open bottom two ends connected to a central portion, the ends being hollow and each configured to cover a cell terminal of the battery, the central portion being hollow and being configured to cover said strap interconnecting two cell terminals, the upper wall of said ends having openings or gaps separated by strips of material and the upper wall as well as the side walls of said central portion also having openings or gaps separated by strips of material.

2. A protector according to claim 1, wherein the strips of material of the upper wall of said ends are substantially parallel to one another, while the strips of material of the upper wall as well as those of the side walls of said central portion are disposed in two mutually perpendicular sets of substantially parallel strips.

3. A protector according to claim 1 or 2, wherein the area of said openings or gaps is substantially twice that of the total area of the protector.

4. A protector according to claim 1, made of rubber whereby cell strap connections of various sizes can be covered by one size of protector.

5. A protector according to claim 1, made of a resilient plastics material whereby cell strap connections of various sizes can be covered by one size of protector.

* * * * *